Dec. 2, 1930.   O. T. GRAHAM ET AL   1,783,332
METHOD OF PRODUCING, TRANSPORTING, AND HANDLING CEMENTITIOUS MATERIAL
Filed Feb. 24, 1928   6 Sheets-Sheet 3
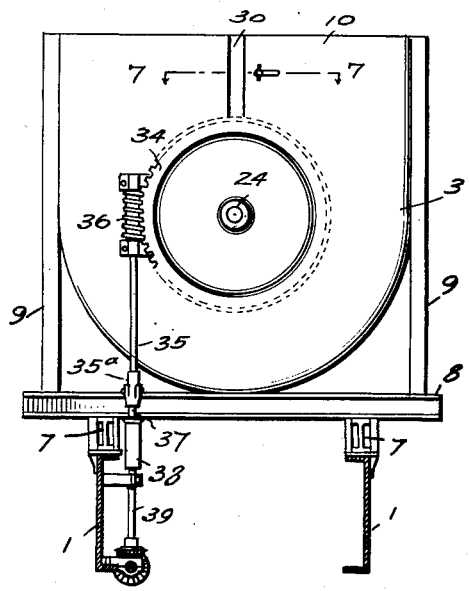
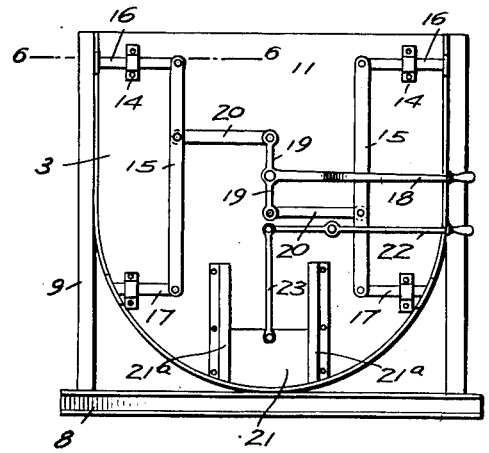
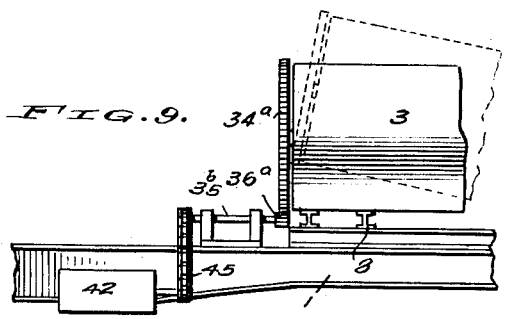
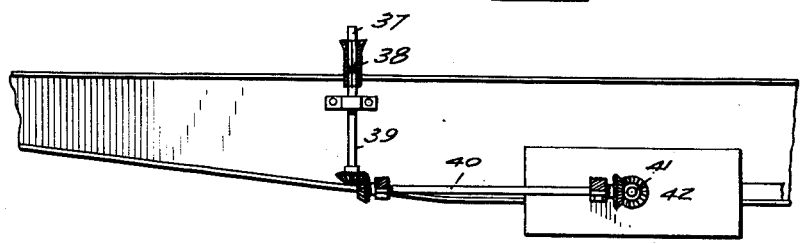
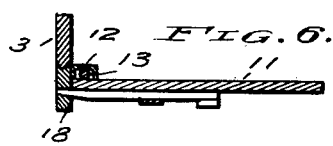
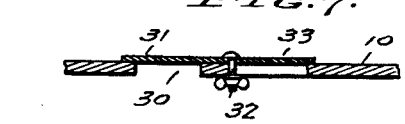
INVENTORS
OTA T. GRAHAM
OAKLEY J. GRAHAM
BY Robert H. Young
ATTORNEY Dec. 2, 1930.  O. T. GRAHAM ET AL  1,783,332
METHOD OF PRODUCING, TRANSPORTING, AND HANDLING CEMENTITIOUS MATERIAL
Filed Feb. 24, 1928  6 Sheets-Sheet 4
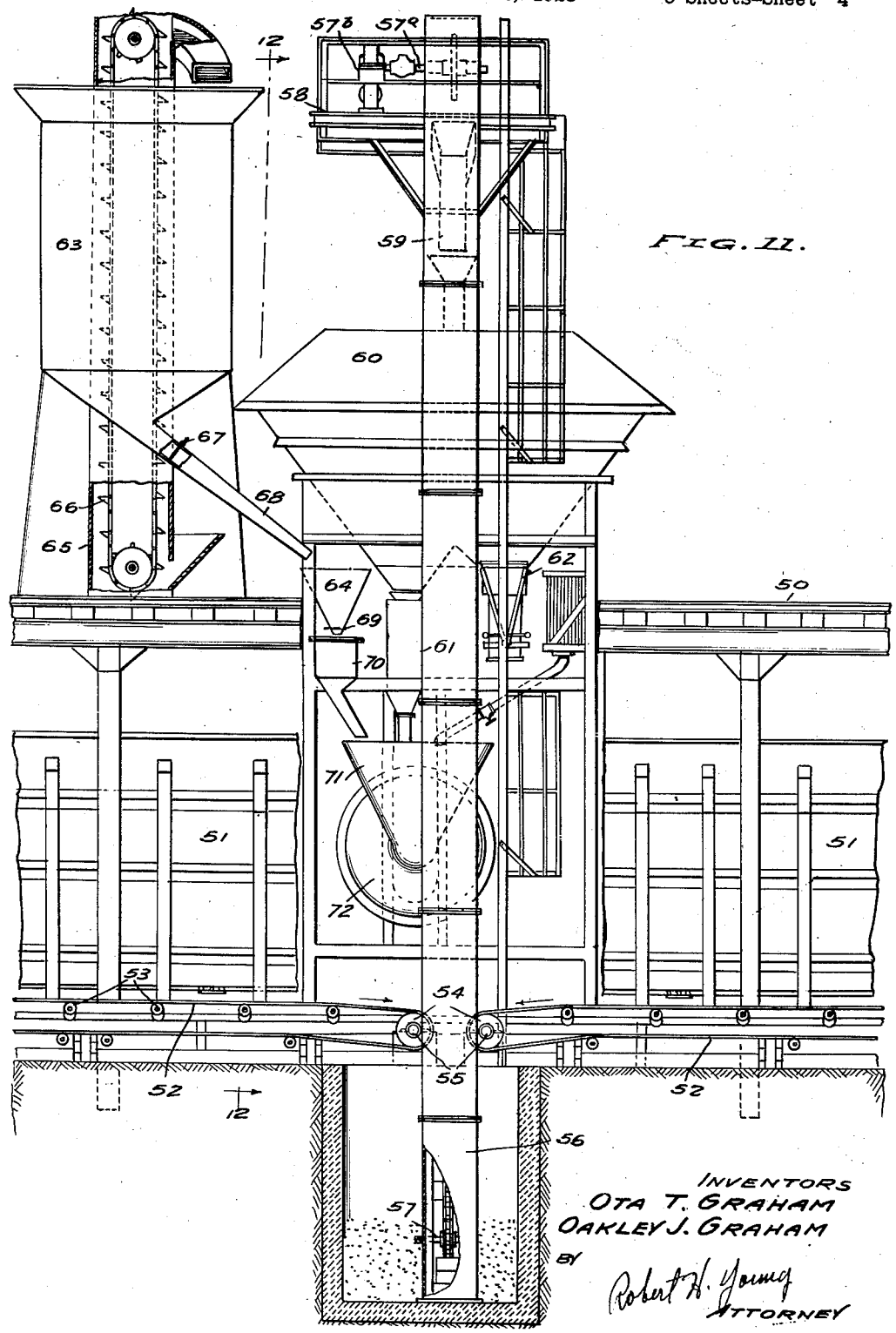
FIG. II.
INVENTORS
OTA T. GRAHAM
OAKLEY J. GRAHAM
BY
Robert H. Young
ATTORNEY Dec. 2, 1930.  O. T. GRAHAM ET AL  1,783,332
METHOD OF PRODUCING, TRANSPORTING, AND HANDLING CEMENTITIOUS MATERIAL
Filed Feb. 24, 1928  6 Sheets-Sheet 6

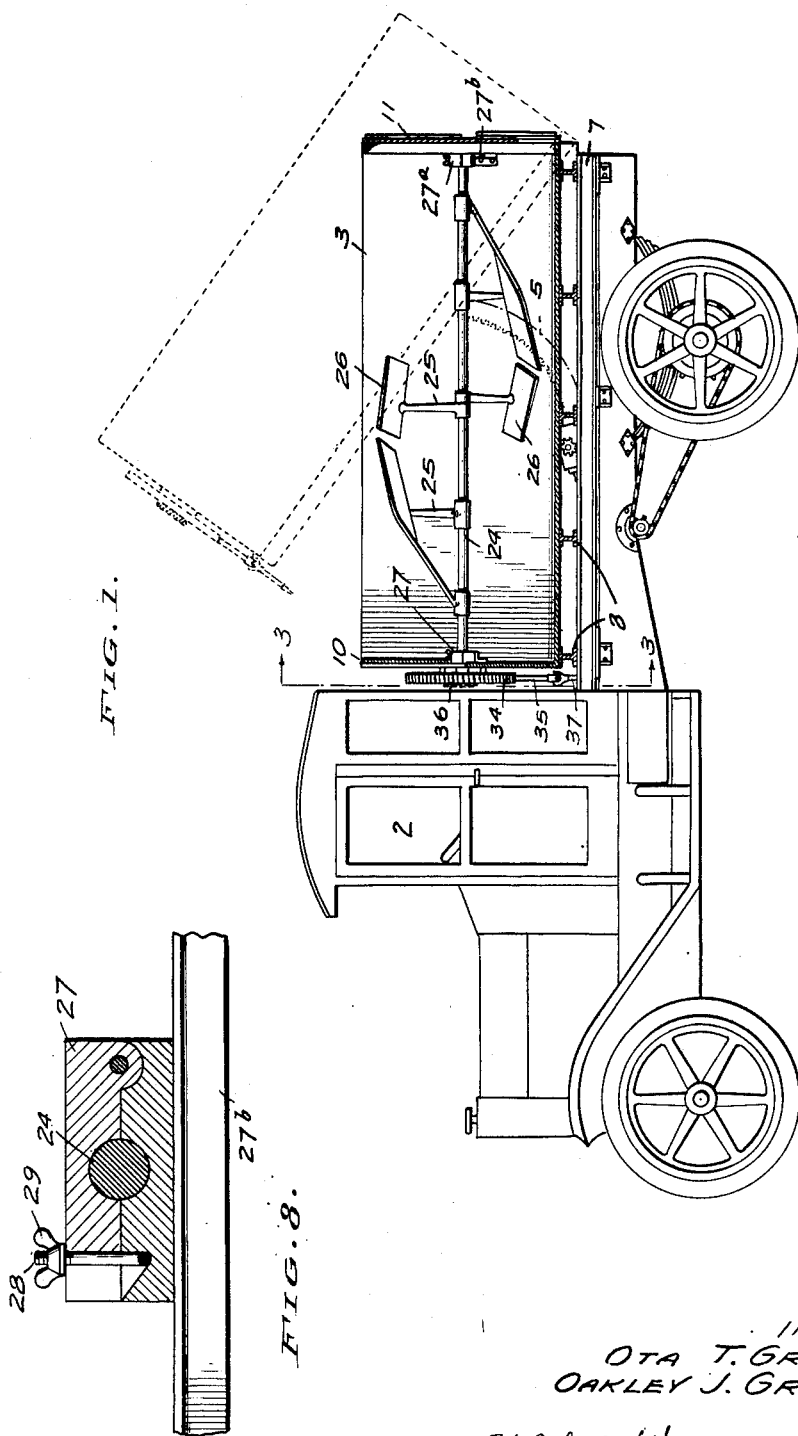

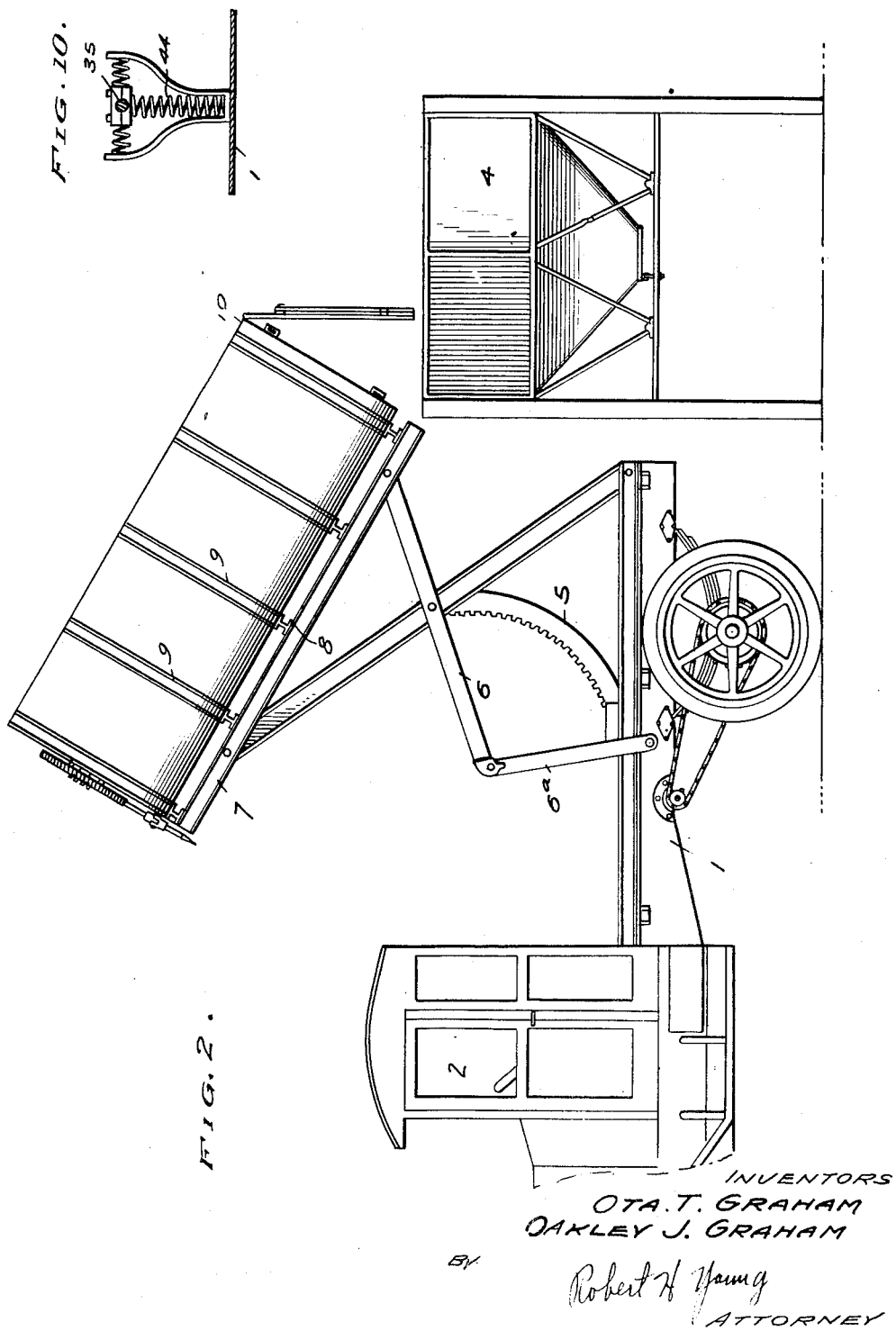

INVENTORS
OTA T. GRAHAM
OAKLEY J. GRAHAM
BY Robert H Young
ATTORNEY

Dec. 2, 1930.   O. T. GRAHAM ET AL   1,783,332
METHOD OF PRODUCING, TRANSPORTING, AND HANDLING CEMENTITIOUS MATERIAL
Filed Feb. 24, 1928   6 Sheets-Sheet 5
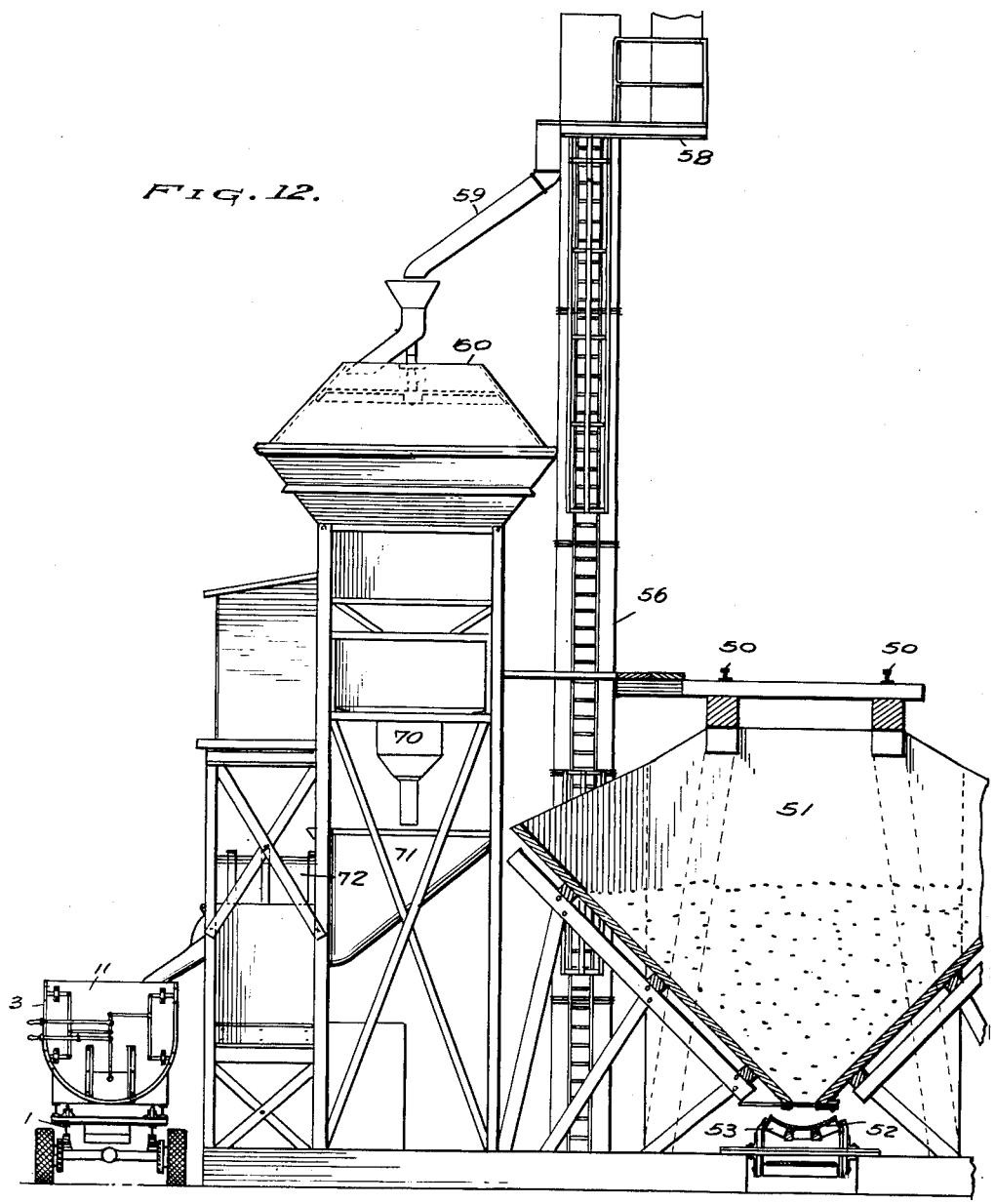
INVENTORS
OTA T. GRAHAM
OAKLEY J. GRAHAM
BY Robert H. Young
ATTORNEY Patented Dec. 2, 1930

1,783,332

UNITED STATES PATENT OFFICE

OTA T. GRAHAM AND OAKLEY J. GRAHAM, OF RICHMOND, VIRGINIA

METHOD OF PRODUCING, TRANSPORTING, AND HANDLING CEMENTITIOUS MATERIAL

Application filed February 24, 1928. Serial No. 256,709.

This invention relates in general to the art of mixing and handling cementitious material such as concrete and the like and is more particularly concerned with a method of handling such materials with the absolute minimum of manual labor wherein all of the ingredients are thoroughly mixed at a central plant in quantity, dumped in any desired amounts into trucks or other suitable carriers for delivery to the place of use, thoroughly agitated while in transit, and dumped as desired for use.

We are aware that the idea of mixing concrete at a conveniently located central plant and transporting the mixed concrete to the place of use is not broadly new and its advantages and economics are obvious, but, insofar as we are aware, all the efforts which have been made heretofore to put this method into practice have failed due to the fact that no steps were taken for preventing the concrete from setting or its ingredients from separating while it is in transit. The result has been, especially on long hauls, that it was necessary to rework the concrete upon dumping at the place of use to overcome the set and reproduce the homogeneous mixture. In carrying out our method we propose to use, as one of the principal parts of necessary equipment, the truck or carrier disclosed in our pending application, Serial Number 184,943 filed April 19, 1927.

We are also aware that portable concrete mixers have been used deriving the requisite power for the operation of the mixing device from the power plant of the truck or tractor used to transport the mixer. It has even been proposed to dump the ingredients into a truck body and actually mix the same while in transit when nearing the place of use. The extremely heavy materials necessary in a concrete mixer render this plan impractical and its proponents admit that the horsepower required to mix the ingredients is so great as to be prohibitive to the successful operation of the truck as a means of conveyance except on very good roads and when they are moving down grade.

It is the prime object of this invention to provide a method of handling the concrete in transit in such a manner as to prevent the setting of the concrete or the segregating of its ingredients and to actually materially improve the qualities of the concrete in transit rather than to permit it to deteriorate.

It is another object of our invention to provide a method of mixing and handling concrete wherein the absolute minimum of manual labor is involved from the first step in the process until the concrete is actually laid.

Another object of our invention is to provide such a method of handling concrete that the cost of the necessary equipment will be greatly reduced.

Another object of our invention is to provide means for handling the mixed concrete at the place of use in such a manner that, after the concrete has been delivered to the point of use, the body of the transporting carrier may be bodily elevated and the contents thereof dumped into a storage hopper from which the concrete may be taken at will, being fed by gravity from the hopper to any carrier used by the consumer.

Other objects of our invention will appear in the following specification and claims and will be disclosed in the accompanying drawings which illustrates a preferred embodiment of the apparatus to be used in carrying out our method of procedure, though it is to be understood that variations from this design may be made to meet specific needs and requirements within the scope of our invention and without departing from the spirit thereof.

In said drawings:—

Figure 1 is a side view of a combined dumping truck and concrete agitator for use in carrying out our invention, the body being in section and straight end dumping position thereof being indicated by dotted lines.

Figure 2 is a view similar to Figure 1, showing the body elevated and tilted to dump the load into a hopper.

Figure 3 is a detail sectional view on the line 3—3 of Figure 1 when the body is in its normal transit position showing the parts on a larger scale.

Figure 4 is a rear view of the body and supporting frame, showing more clearly the end gate and parts intimately associated therewith.

Figure 5 is a fragmentary view showing more clearly the transmission for the agitator.

Figure 6 is an enlarged sectional view on the line 6—6 of Figure 4.

Figure 7 is an enlarged sectional view on the line 7—7 of Figure 3.

Figure 8 is an enlarged sectional view of one of the bearings for the shaft of the agitator.

Figure 9 is a detail view of a modification.

Figure 10 is a detail view showing one way of yieldably mounting the transmission shaft shown in Figure 9.

Figure 11 is a front elevation partly in section of our central mixing plant.

Figure 12 is a section on the line 12—12 of Figure 11.

Figure 13 is a detail of one of our carrier rollers.

Figure 14:
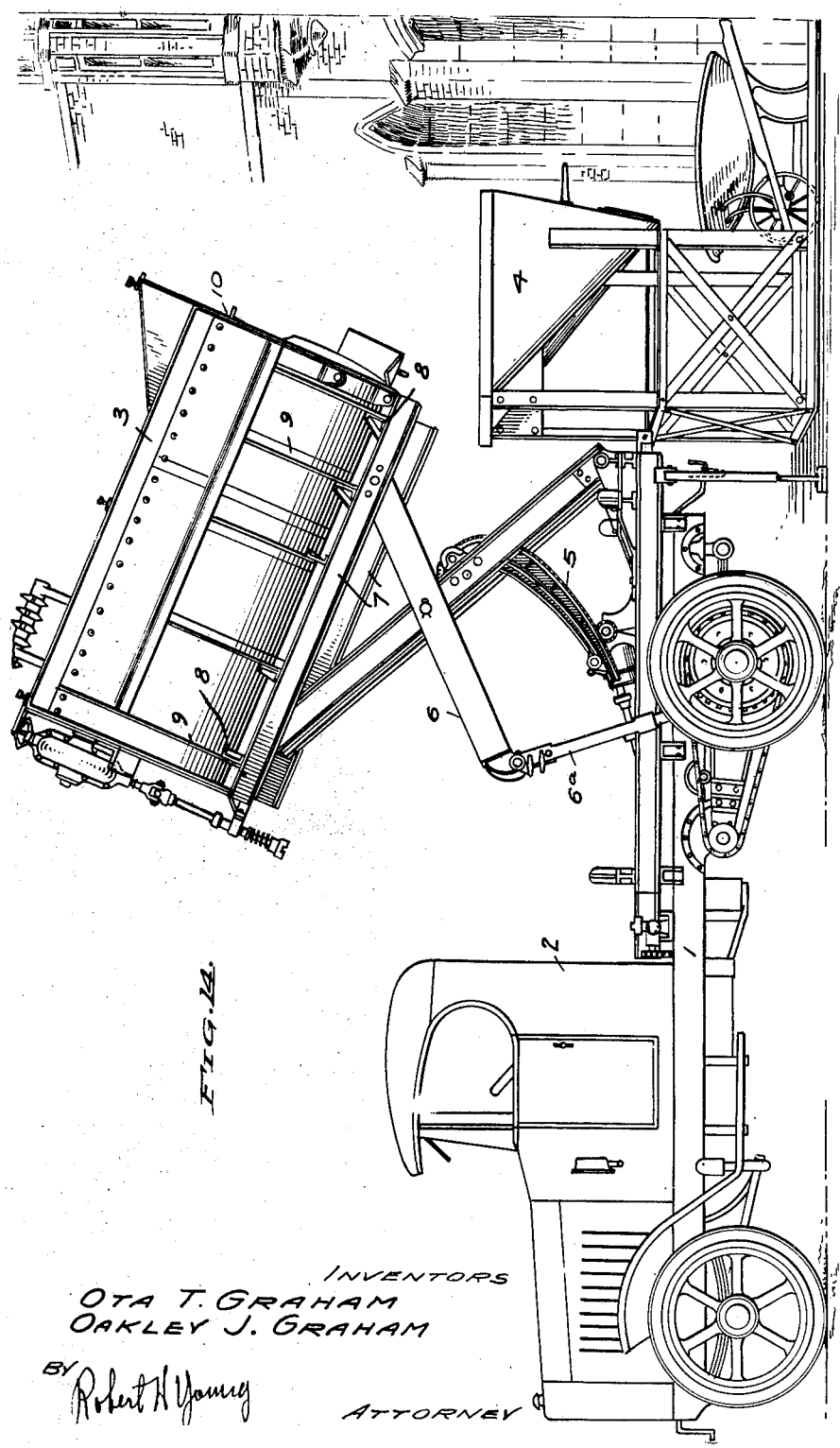
Figure 14 is a modification of the structure shown in Figure 2.

The truck and chassis may be of any approved construction and are illustrated merely to demonstrate the application of this invention. The same is true of the central mixing plant which will be described hereinafter. It is understood that the truck will be provided with the usual motor unit for propulsion and will provide that power may be taken from such a unit for operating our agitator and for tilting or elevating, or both, the carrier body to discharge the load. The power take-off from the motor may be of any well known construction and is illustrated here as merely one embodiment of a means for effecting the ends desired.

The chassis includes a frame 1 which is located rearwardly of the cab 2 and upon which the body 3 is supported to be tilted for a straight end dump as illustrated by the dotted lines in Figure 1, or to be elevated for a hilift dump as indicated in Figure 2 whereby the mixture may be discharged into a hopper 4 from which it may be delivered in quantities as desired into wheelbarrows or other carriers for direct delivery to the work. The lifting mechanism associated with the body 3 is of ordinary and well known construction and includes a two direction power take-off, not shown. Lifting device 5 includes a lazytong structure comprising two pivotally connected frame members 6 one of which is in turn pivotally connected to a member 6a pivoted to the sub frame 1.

The body 3 is shown as of a substantially U-shaped transverse section and consists of sheet metal which may be of comparative thinness since the concrete or other cementitious material is to be completely and thoroughly mixed prior to being dumped into the truck, and is mounted in a rack or supporting frame including the longitudinal members 7, transverse members 8 and vertical side bars 9. The body lifting mechanism connects the rack or supporting frame with the frame of the chassis or carrier as indicated most clearly in Figure 2.

The bottom of the body 3 is preferably made rounded to conform to the circular path of the agitator. The front end 10 of the body is fixed whereas the rear end 11 is pivoted to be swung outwardly at its lower end, as is shown more clearly in Figure 2, so as to dump the load. The rear end 11 constitutes a tail gate and is pivoted at its upper end to the sides of the body in any approved manner. A channel strip 12 is fitted to the inner side of the body 3 adjacent to the swing end 11 and receives a packing 13 of rubber or other suitable yieldable material, whereby a tight joint is maintained between the body and the end gate 11 to prevent the escape of any comparatively liquid mixture. The end or tail gate 11 is held closed by a plurality of laterally sliding bolts mounted in keepers 14 applied to the outer or rear side thereof. The bolts are provided in sets which are connected by means of bars 15, each set including an upper bolt 16, and a lower bolt 17. The outer ends of the several bolts are beveled and operate by a wedging action to close the gate 11 and compress the packing 13, so as to insure a closed joint, whereby to prevent the escape of any moisture from the concrete or other material. An operating lever 18 is pivoted at its inner end to the gate 11 and has oppositely disposed arms 19 at its inner end which are connected by means of links 20 to the bars 15. In consequence of this arrangement, all the bolts 16 and 17 are simultaneously operated and when shot outward their beveled ends operate by a wedging action to force the gate 11 into closed position to secure a tight joint through the instrumentality of the packing 13 in the manner stated. An opening formed in the lower end of the gate 11 is closed by means of a cut-off 21 slidably mounted in guides 21a applied to the rear side of the gate 11. An operating lever 22 is pivoted to the gate and connected to the cut-off 21 by means of a link 23. In this manner the concrete, or other content, of the body may be delivered in small quantities.

In the structure which is shown we have disclosed an agitator which is removably fitted within the body 3 so that it may be detached and laid aside when the truck body is required for general hauling of merchandise or commodities which operation would not be feasible if the agitator were fixed or nondetachable.

The agitator comprises a shaft 24, arms 25 radiating from the shaft and disposed at different relative angles, and blades 26 at the outer ends of the said arms 25. The shaft 24 is mounted at its ends in separable bearings 27 and 27a, one of which is applied to the inwardly presented side of the end 10 of the body and the other is supported in a cross beam 27b forward of the tail gate 11. The bearings 27 and 27a are shown in detail in Figure 8 and are held in closed position by means of a threaded stem 28 pivoted at one end to one of the elements of the bearings and engaging a slot in the other element of the bearings and receiving a nut 29 on the threaded end for securing the parts when the elements of the bearings are closed, as indicated in Figure 8. A vertical slot 30 is formed in the upper portion of the end 10 and admits of the passage of the adjacent end of the shaft 24 therethrough, both when placing the agitator in position and when removing it from the body. The slot 30 is normally closed by means of a plate 31 which is retained in place by means of a bolt 32 carried by the plate and operable in a slot 33 formed in the end 10 to one side of the vertical slot 30. The front end of the shaft 24 projects beyond the end 10 and receives a gear wheel 34 which is fast thereto. A vertical shaft 35 mounted upon the body and movable therewith is provided with a worm 36 which is adapted to mesh with the worm teeth of the gear wheel 34. An extension or section 37 of the shaft 35 is connected thereto by means of a universal joint 35a and the lower end of the extension 37 is pointed and made square to coact with a socket 38 at the upper end of a vertically disposed shaft 39 which is connected in any preferred way to the power unit of the carrying truck. It will thus be understood that the two shafts 35 and 39 are coupled by means of a slip connection which automatically separates when the body is lifted and couples when the body is lowered. As indicated most clearly in Figure 5 of the drawings the shaft 39 is connected by shaft 40 and gears to a shaft 41 of a transmission 42, generally provided for taking off power for operating parts to be driven which, in the present instance, consist of the agitator or mixer and the lifting mechanism for raising and lowering of the body. When the body is tilted or lifted, the shaft 35 moves therewith, the coupling between the two shafts 35 and 39 separating by means of the slip joint. When the body is lowered into normal position the shafts 35 and 39 are automatically coupled by the part 37 slipping into the part 38. The square or non-circular joint between the parts 37 and 38 causes said parts to rotate together when coupled, thereby admitting of power being transmitted to the agitator. The worm gearing 34 and 36 results in a slow movement of the agitator, thereby preventing any tendency of the concrete to set or separate during transportation, particularly if the point of delivery is distantly situated from the plant or point of distribution.

It is observed that the construction is such as to admit of the material being dumped into a hopper 4 or to be directed by means of a chute, not shown, which may be applied to the delivery opening in the lower end of the tail gate 11 closed by means of the cut-off 21. For general haulage the agitator may be easily and quickly removed from the body, thereby admitting of the full capacity of the body being utilized for reception of the load, and this feature is advantageous and a departure in the art so far as known.

In the modification shown in Figures 9 and 10, the dumping body 3 may be mounted in any usual or preferred way for a hi-lift or a straight end dump and has a gear wheel 34a associated therewith for effecting an agitating of the material to be stirred. A cooperating gear 36a fast to a transmission shaft 35b imparts movement to the gear 34a for effecting movement of the agitator. When the body 3 moves to dump the load the gears 34a and 36a separate. This admits of lifting the body clear of the chassis which is advantageous for a hi-lift to dump the material into a hopper. When the body returns to normal position the gears 34a and 36a intermesh. The intermeshing is assured by yieldably mounting the shaft 35b as shown most clearly in Figure 10. The bearing 43 for the shaft 35b is supported by means of springs 44. A sprocket chain 45 connects the shaft 35b with the power take-off shaft 41 of the transmission 42. When the agitator is removed the body 3 may be used for general haulage since its capacity is unobstructed.

Having reference now to Figures 11, 12 and 13 it will be seen that we have arranged our central mixing plant so that the railroad cars supplying the necessary sand and gravel can be brought on tracks 50 directly over the separate V-shaped bins 51 so that the sand and various grades of gravel or other ingredients can be unloaded without recourse to manual labor. Suitable gates are provided at the base of these bins for dumping the sand or gravel directly on to the endless belt carriers 52 which pass over rollers 53 arranged, as shown in Figure 13, to give concavity to the loaded belts which are driven by pulleys 54 mounted on shafts 55 driven by or connected to any suitable power unit of our central mixing plant.

The sand or gravel carried by the belt carriers 52 is dumped into a chute leading into a boot 56 where it is picked up by an endless bucket conveyor driven by a shaft 57a operated by any suitable power unit 57b, and carried to the top of the tower 58 and dumped through a pivotally mounted tubular guide or spout 59 into a hopper 60. This hopper 60 is partitioned to provide several main compartments for various kinds and grades of aggregate. Suitable traps are provided for the release of the gravel from either of these partitioned compartments into down pipes for conducting the material into an automatic weighing machine 61 which is adjustable to prevent further load after the desired amount of gravel for the mixing of a batch of concrete or other cementitious material has been supplied from the hopper 60.

Other necessary ingredients for the manufacture of concrete are sand and water. We have provided, for this purpose, an inundator 62, of well known and patented structure, for automatically and adjustably governing the amount of sand and water to be admitted to any batch to be mixed.

A cement storage hopper 63 elevated above the cement receiving hopper 64 is provided for storing cement. Cars are brought up on track 50 adjacent hopper 63, the cement being unloaded therefrom into a receiving boot 65 and elevated to the top of the hopper 63 by a bucket elevator 66. The storage hopper 63 is provided with a gate 67 at its base for dumping cement into chute 68 leading to the receiving hopper 64 which is provided with a roller gate 69 which feeds the cement weighing machine 70, from which the cement is emptied into the charging hopper 71. The gravel from the automatic weighing machine 61 is also led into the charging hopper 71.

After leaving the charging hopper 71 the component parts of the mixture are admitted into a mixer rotatably mounted in the plant tower and adapted to contain a considerable bulk of aggregate material. The mixer 72 is adapted to be rotated in any suitable manner by power from the power unit of the mixing plant for the purpose of thoroughly commingling the ingredients employed.

After the ingredients are thoroughly mixed in the mixer 72 they are dumped into trucks, or other carriers, such as are disclosed in the early part of this specification and are then hauled to the place of use. In transit the thoroughly mixed cementitious material is continually agitated by the agitator, as disclosed, and delivered at the place of use as a composite material which, not only has not been deteriorated in transit, but which has been greatly improved as to its homogeneous qualities and as to its stress resistance.

In this application we have thoroughly disclosed a method for handling cementitious materials wherein the raw materials are handled almost entirely by machinery in the central mixing plant, being automatically and positively proportioned and mixed with a minimum of manual labor. The mixed concrete is then dumped in batches in any quantities desired into trucks or carriers of any type for transportation to the place of use. The carriers are provided with means for agitating the mixed cementitious material while in transit to the point of use and with means for dumping the same at either a high or low level. The agitators may be driven by the power plant of a motor truck if such is employed for transportation but may be operated by any moving part of any carrier used, or any motive power mounted thereon.

If the work engaged upon is that of the laying of sidewalks or streets the concrete may be dumped by merely pivoting the body, but if construction work in the nature of building is engaged upon the high lift feature of any carrier may be advantageously employed to dump the material into a conveyor boot or into a storage hopper for use as desired.

We claim:

1. In a method of producing, transporting, and handling cementitious materials, those steps which include the mixing of the cementitious material in batches at a mixing plant, dumping the mixed material in quantities as desired into carriers for delivery to points distant while plastic, agitating the cementitious material while in transit, bodily elevating the whole mass of concrete and dumping the same in quantities as desired at a point above the normal position of the chassis of the carrier.

2. In a method of producing, transporting and handling concrete, those steps which include the mixing of the concrete in batches at a mixing plant, dumping the concrete in quantities as desired into carriers for delivery to points distant, agitating the concrete while in transit, bodily elevating the whole mass of concrete and dumping the same in quantities as desired at a point above the normal position of the chassis of the carrier.

3. In a method of producing, transporting, and handling concrete, those steps which include the mixing of the concrete in batches at a mixing plant, dumping the concrete in quantities as desired into carriers for delivery to points distant, agitating the concrete while in transit, bodily elevating the whole mass of concrete and dumping the same into storage hoppers in quantities as desired at a point above the normal position of the chassis of the carrier.

4. In a plant for handling aggregate for cementitious materials, an elevated trestle for supply carriers, gravity feeding bins positioned below said trestle, gate at the bases of said bins, mechanical conveyors positioned to receive said aggregate from said bins and to convey the same to a central point of deposit, a mechanical elevator for elevating said aggregate from said point of deposit, a storage hopper for receiving said aggregate when elevated, means adapted to receive the aggregate from said hopper and proportion said aggregate as required, a charging hopper, and means for dumping proportioned aggregates from said proporting means into said charging hopper and thence into transporting carriers for delivery to points distant.

5. In a plant for handling aggregate for cementitious materials, an elevated trestle for supply carriers, gravity feeding bins positioned below said trestle, gates at the bases of said bins, mechanical conveyors positioned to receive said aggregate from said bins and to convey the same to a central point of deposit, a mechanical elevator for elevating said aggregate from said point of deposit, a storage hopper for receiving said aggregate when elevated, means adapted to receive the aggregate from said hopper and proportion said aggregate as required, a charging hopper, and means for dumping proportioned aggregates from said proporting means into said charging hopper and thence into a mixer positioned to receive the same therefrom.

6. In a method of producing, handling and transporting concrete, those steps which consist in placing the materials in a carrier at one point or location, transporting the carrier to a distant point, effecting the agitation of the materials in the carrier, bodily elevating the carrier, delivering the entire contents of the carrier by gravity into a receptacle having capacity to receive this amount and removing from the receptacle by gravity lesser amounts from time to time as desired.

In testimony whereof we have affixed our signatures.

OTA T. GRAHAM.
OAKLEY J. GRAHAM.